T. STROBRIDGE.
Coffee and Spice Mill.

No. 200,777. Patented Feb. 26, 1878.

Witnesses:
John K. Smith
John F. Best

Inventor:
Turner Strobridge
by Bakewell & Kerr
Atty's

UNITED STATES PATENT OFFICE.

TURNER STROBRIDGE, OF NEW BRIGHTON, PENNSYLVANIA.

IMPROVEMENT IN COFFEE AND SPICE MILLS.

Specification forming part of Letters Patent No. 200,777, dated February 26, 1878; application filed February 7, 1878.

*To all whom it may concern:*

Be it known that I, TURNER STROBRIDGE, of New Brighton, in the county of Beaver and State of Pennsylvania, have invented a new and useful Improvement in Coffee, Spice, and other Mills; and I do hereby declare the following to be a full, clear, and exact description thereof, reference being had to the accompanying drawings, forming part of this specification, in which—

Figure 1:
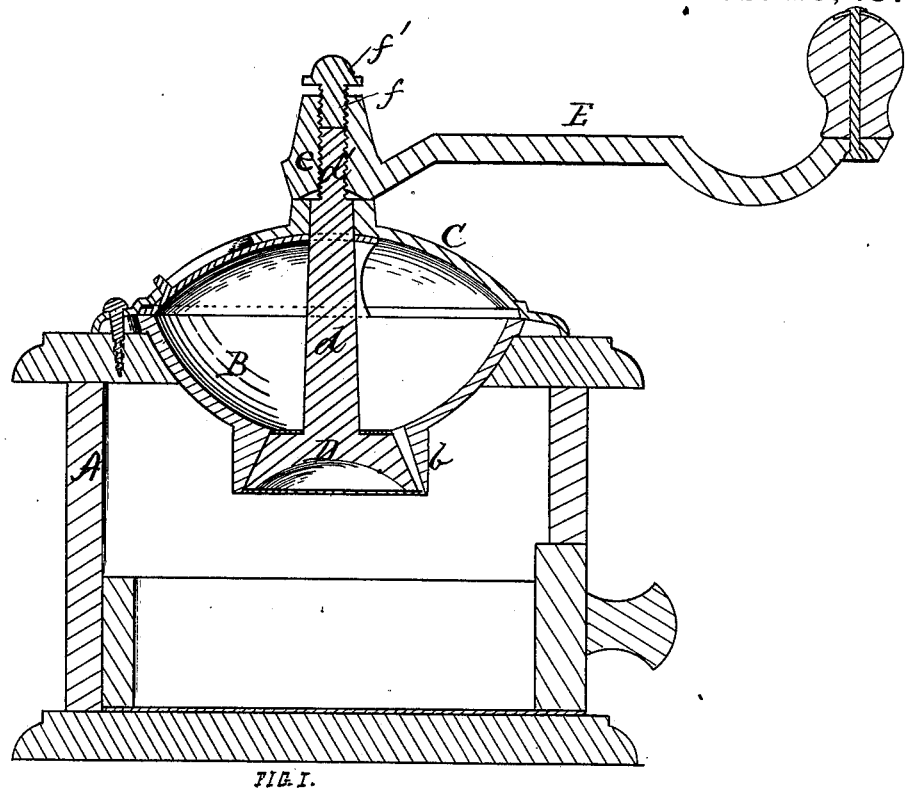
Figure 2:
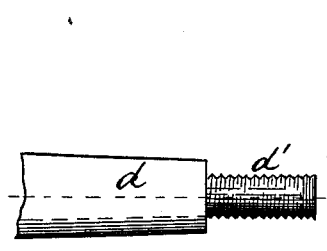
Figure 3:
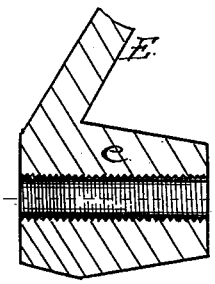
Figure 4:
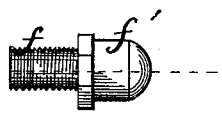

Figure 1 is a vertical central section of a mill embodying my invention. Figs. 2, 3, and 4 are detached views of the grinding-nut shank and the regulating or set screw.

Like letters refer to like parts wherever they occur.

My invention relates to the construction of coffee, spice, and other mills, wherein an adjustment between the grinding-nut and its shell or equivalent parts is required.

Several methods or series of devices have heretofore been employed to regulate the relations of the grinding-nut to its shell or an equivalent part—as, for instance, the ordinary nut which secures the crank to the shank of the grinding-nut, and the cross-piece or bearing-bar in which the grinding-nut is stepped; but such devices are, in the main, objectionable, because in the one case they lack accuracy, and are liable to permit the adjustment to change or vary while the mill is in operation, and in the other case they are too complicated, and not readily manipulated.

I will now proceed to describe my invention, so that others skilled in the art to which it appertains may apply the same.

In the drawing, A indicates the box of a coffee, spice, or similar mill; B, the hopper, which usually terminates in a grinding-shell, $b$; C, the cover, in lieu of which a simple crossbar or bridge may be used; and D, the grinding-nut, all of which parts may be of any desired or known character, as they constitute no part of the present invention, except in so far as such or similar devices go to make up a mill.

The grinding-nut D is provided with a shank, $d$, terminating in a threaded portion, $d'$, as in the ordinary mills, where a nut is used to secure the crank and make an adjustment. E represents the handle or crank, which I form with an internally-threaded collar or nut, $e$, adapted to fit the threaded end $d'$ of the shank $d$, and provide it with a set-screw, $f$, preferably of the diameter and pitch of the threaded end $d'$ of shank $d$. This set-screw $f$ may have an ornamental head, $f'$, if desired.

The parts of the mill may be set up as usual, the shank of the grinding-nut projecting above the cover, cross-bar, or bridge. The crank is then screwed on the threaded end of the grinding-nut shank until the grinding-nut shank is brought as close to its shell as is desired, when the set-screw or jam-screw $f$ is screwed in until it bears against the shank, preventing the threaded collar or nut $e$ from advancing farther.

If it is desired to set the grinding-nut so that the mill will grind coarser, the crank is reversed to unscrew or withdraw the collar $e$, and thus allow the grinding-nut to recede from the grinding-shell, after which the set-screw $f$ is screwed in until it strikes the shank. When the mill is to be set to grind finer, the set-screw $f$ is withdrawn the desired distance, and the crank is then turned, causing the nut or collar $e$ thereof to advance on the shank until arrested by the set-screw $f$.

These devices are equally applicable to side mills wherein a grinding nut and shell are employed, the only change from the mill shown being due to arrangement of the parts, and such as any mechanic can readily make.

The advantages of my devices are simplicity, effectiveness, durability, and convenience of altering adjustments.

Having thus described my invention, what I claim, and desire to secure by Letters Patent, is—

In a coffee, spice, or similar mill, the combination, with a grinding-nut having a threaded shank, of a crank provided with a threaded nut or collar, adjustable on the threaded shank, and a set or jam screw, for fixing the position of the adjustable crank, substantially as and for the purpose specified.

In testimony whereof I, the said TURNER STROBRIDGE, have hereunto set my hand.

TURNER STROBRIDGE.

Witnesses:
 JOHN GLASS,
 G. W. GLASS.